US010803181B2

(12) United States Patent
McCoy et al.

(10) Patent No.: US 10,803,181 B2
(45) Date of Patent: Oct. 13, 2020

(54) DATA SECURITY AND PROTECTION SYSTEM USING UNIQUENESS FACTOR CLASSIFICATION AND ANALYSIS

(71) Applicant: ACCENTURE GLOBAL SOLUTIONS LIMITED, Dublin (IE)

(72) Inventors: Anthony McCoy, Dublin (IE); Aoife Whelan, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 375 days.

(21) Appl. No.: 15/866,339

(22) Filed: Jan. 9, 2018

(65) Prior Publication Data
US 2019/0213332 A1 Jul. 11, 2019

(51) Int. Cl.
*G06F 21/55* (2013.01)
*H04L 29/06* (2006.01)
(Continued)

(52) U.S. Cl.
CPC .......... *G06F 21/577* (2013.01); *G06F 21/552* (2013.01); *G06Q 10/0635* (2013.01); *H04L 63/20* (2013.01)

(58) Field of Classification Search
CPC .. G06F 21/577; G06F 21/552; G06F 21/6245; G06F 21/55; G06F 21/57;
(Continued)

(56) References Cited

U.S. PATENT DOCUMENTS

2007/0136339 A1* 6/2007 Garg .................. G06Q 30/02
2015/0379303 A1* 12/2015 LaFever ............. G06F 21/6254
726/28
(Continued)

FOREIGN PATENT DOCUMENTS

WO 2017/187207 11/2017

OTHER PUBLICATIONS

1. WO2017008144—Re-Identification Risk Measurement Estimation of a Dataset (Year: 2017).*
(Continued)

*Primary Examiner* — Alexander Lagor
*Assistant Examiner* — Vu V Tran
(74) *Attorney, Agent, or Firm* — Mannava & Kang, P.C.

(57) ABSTRACT

A data security and protection system that provides monitoring, diagnostics, and analytics within an enterprise network to identify potentially sensitive data is disclosed. The system may provide one or more data stores to store and manage personal data within a network. The system may also provide one or more servers to facilitate operations using information from the one or more data stores. The system may also provide an analytics system with processing components that determines uniqueness of personal data. The system may receive personal data and population attribute data via a data access interface. The analytics system may compare the data received to determine a fraction assignment, which when further processed using at least a combination or correlation technique, may yield a detailed uniqueness factor classification and analysis of the personal data to indicate its relative sensitivity. If there is risk associated with the sensitivity of the personal data, additional security actions may be taken by the data security and protection system.

18 Claims, 6 Drawing Sheets

(51) Int. Cl.
*H04W 12/00* (2009.01)
*H04W 12/02* (2009.01)
*G06F 21/62* (2013.01)
*G06Q 10/06* (2012.01)
*G06F 21/57* (2013.01)

(58) Field of Classification Search
CPC . H04L 63/20; H04L 63/1408; H04L 63/0407; G06Q 10/0635; G06Q 20/4016; H04W 12/02; H04W 12/00505
See application file for complete search history.

(56) References Cited

U.S. PATENT DOCUMENTS

| | | |
|---|---|---|
| 2016/0154978 A1 | 6/2016 | Baker et al. |
| 2017/0124659 A1* | 5/2017 | Drennan, III .......... G06Q 40/08 |
| 2017/0243028 A1 | 8/2017 | Lefever et al. |
| 2018/0063182 A1* | 3/2018 | Jones .................. H04L 63/1433 |
| 2018/0114037 A1* | 4/2018 | Scaiano ................ G06F 16/219 |
| 2019/0130131 A1* | 5/2019 | Huang .................. G06F 16/285 |
| 2019/0171984 A1* | 6/2019 | Irimie ................ G06Q 10/0635 |

OTHER PUBLICATIONS

Daries, J. P. et al., "Privacy, Anonymity, and Big Data in the Social Sciences", Communications of the ACM, vol. 57, No. 9, published Sep. 2014, pp. 56-63.

* cited by examiner

DATA SECURITY AND PROTECTION SYSTEM USING UNIQUENESS FACTOR CLASSIFICATION AND ANALYSIS

TECHNICAL FIELD

This patent application relates generally to data security and data protection, and more specifically, to systems and methods for data security and protection using uniqueness factor classification and analysis.

BACKGROUND

Cyberattacks and data breaches are becoming a more serious threat to individuals, organizations, and overall society. The number of attacks are also increasing at a rapid rate. Several conventional approaches have been used to combat data security problems. Disk encryption in hardware and software, such as on-the-fly encryption (OTFE) or transparent encryption, involves converting data to an unreadable or otherwise inaccessible format. Data masking or data obfuscation is used to "hide" data. Masking is achieved by inserting random characters in data fields to mislead and prevent sensitive data from being accessed by unauthorized personnel. Backups are used for recovery of data to help restore data in the event of data corruption or erasure. These and other conventional techniques are used to help minimize impact of cyberattacks or data breaches.

A technical problem associated with conventional techniques for protecting sensitive data is that these techniques assume the data to be protected is already identified. In many enterprise environments, however, data is stored and accessed across multiple locations and multiple systems. Therefore, it is often a technical challenge to identify exactly what data is sensitive so that proper measures could be taken to protect that data. Currently, system administrators take the approach that if data is for a particular client or a particular department, such as human resources, it may be considered sensitive and data received at this particular department would warrant protections. However, in many instances, these general policies will be insufficient to protect sensitive data. For example, sensitive data may be stored in multiple databases outside of the human resources department, and if the administrator fails to identify a particular database as storing sensitive data, that data may not be afforded the needed security and protections. Attacks or hacks on databases housing this data may not be easily prevented or tracked.

Another common technical problem associated with identifying sensitive data is that a particular piece of data, by itself, may not be considered sensitive. However, that data when aggregated with other data may be considered sensitive. In fact, this situation has been identified as having potential for serious data breaches, and many new laws and legislation are being passed to better protect such private and personal data. The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data.

However, given the large quantities, and typically distributed nature, of personal data that may be stored and managed by a particular entity, it is a serious technical challenge for that organizational entity to identify exactly what data is considered "sensitive" personal data under these newly developed data protection laws.

Furthermore, many companies do not have adequate businesses practices in place to handle new requirements associated with these new laws and regulations. For example, non-EU companies doing international business may not have an up-to-date implementation strategy to properly manage the personal and private data in their possession. These companies typically also lack knowledge and expertise to adjust to changing requirements to new laws as they arise.

Yet another technical problem relates to post data breach. After a data breach has occurred, it can be difficult to identify whether the data that was compromised was in fact "sensitive" personal data. If the data is considered "sensitive," an organization entity where the breach occurred would normally be required to send notification of the data breach to the effected individuals. If it is unknown what personal data is "sensitive," those who gain unauthorized access to that data may often just easily escape without anyone even knowing there was a data breach.

As a result, a more robust approach may be needed to better secure and protect sensitive data, especially with regard to identification and protection of sensitive personal data at an enterprise level.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
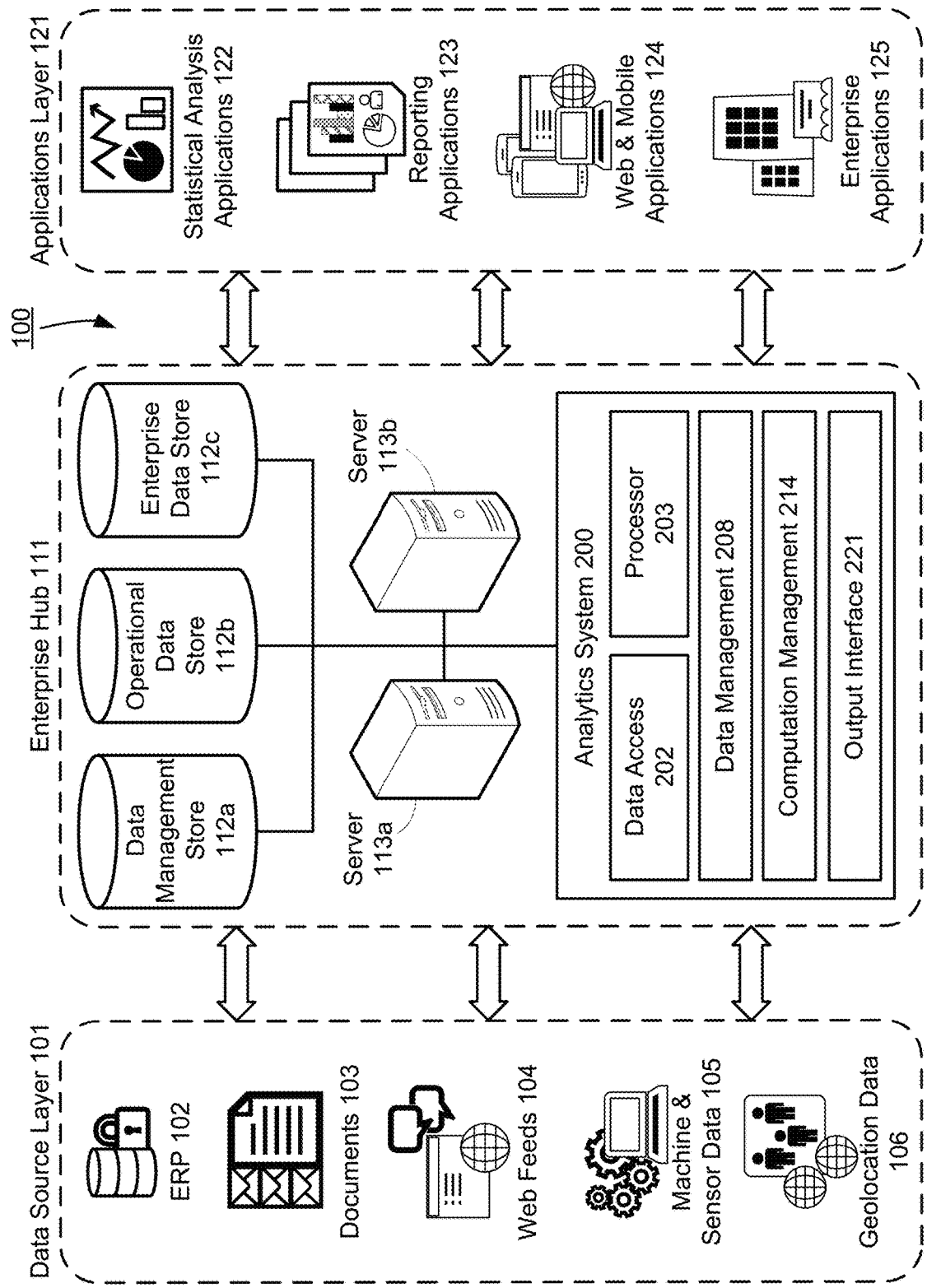
FIG. 1 illustrates an architecture for a data security and protection system, according to an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

As described above, cyberattacks and data breaches are becoming a more serious threat. The number of attacks are also increasing at a rapid rate. Several conventional approaches have been used to combat data security problems. However, with new laws and legislation being passed, a more robust approach may be needed to better secure and protect sensitive data, especially with regard to personal data at an enterprise level.

According to examples described herein, a data security and protection system for enterprise data containing sensitive personal information may be provided. The data security and protection system described herein may provide monitoring, diagnostics, and analytics to identify potentially sensitive data. For example, the data security and protection system may identify personally identifiable information in an enterprise and group this information into one or more "profiles," where a particular profile may represent or identify a particular person or individual. The information may be identified in both structured data stores such as databases, or unstructured data such as documents. The information in the profiles may also be linked together across structured or unstructured data so that each profile may be a representation of most or all data on an individual in that enterprise. The data security and protection system may also determine and provide a sensitivity score that is based on a calculation per profile to "quantify" how identifiable the information contained within it could potentially identify that individual. Ultimately, the data security and protection system may use these calculations to better protect personal and sensitive data in accordance with privacy and data laws governing enterprises or similar organizational entities.

Personal data may refer to or include any data associated to a living individual who is or can be identified from that data, or from the data in conjunction with other information or data. "Sensitivity" of personal data, then, may refer to the relative ease at which an individual could be identified from available data. In other words, the sensitivity of personal data may be based on a uniqueness of data or a combination of that data associated with an individual. This uniqueness may be based on how many other individuals share that same combination of attributes. For example, personal data may have unique identifiers, such as social security number, tax ID, driver's license, passport number, fingerprint, retina profile, biometrics, etc. This data may be readily considered sensitive because this data more easily points to a particular individual. As a result, this type of data should be treated almost automatically as "sensitive" and proper handling of that data may be required at an organizational entity.

Non-unique identifiers in personal data, however, may not as easily be identified as "sensitive." These may include name, height, weight, age, eye color, shoe size, hair color, blood type, handwriting, employer, school, etc. When taken individually, these non-unique identifiers in personal data may not readily point to any particular individual. For example, there may be many people named John Smith, or many people that wear size 10 shoes. However, when several non-unique identifiers are taken in the aggregate, this combination of non-identifiers in personal data may lead to a higher probability of identifying a particular individual. For example, while there may be many individuals named John Smith, there may only be one that is 32 years old, with black hair, brown eyes, blood type A, wears size 10 shoes, and works at Company X. If an organizational entity possesses this data on this particular individual, the data or collection of data may then be considered potentially "sensitive" since it may be used to identify and point to a single identifiable person.

Conventional aggregation approaches and methods do not meet the demands of new laws on data protection that have new definitions of sensitive personal data. For example, using a manual, static, or rule-based combination of non-unique identifiers in a "matrix" may not accurately, reliably, or efficiently result in identification of sensitive data. Merely forming a matrix of non-unique identifiers, however, may be insufficient in the current enterprise environment. For instance, a matrix is typically very large, complex, and cumbersome. It will therefore be unmanageable and generally incompatible with new laws governing the handling of sensitive personal data which require speed, accuracy, and efficiency. Other conventional approaches that use "bucketized" classification of risk (e.g., high, medium, low) may not be sufficiently accurate or reliable when it comes to risk prioritization across larger datasets. Furthermore, conventional approaches to determine sensitivity or assignment of risk lack granularity may lead to false identification of sensitive personal data or complete lack of identification altogether.

The data security and protection system described herein may provide monitoring, diagnostics, and analytics to identify potentially sensitive data. Instead of the static or matrix approach associated with traditional systems, the data security and protection system may use real-time or near real-time population attribute data, e.g., found in census databases, for example, to use in uniqueness classification of non-unique identifiers found in enterprise data. Using this information, as well as analytics that include comparison, correlation, and combination calculations, a risk value may be determined. This risk value may articulate "sensitivity" of personal data more accurately, and more importantly, in compliance with new laws and requirements surrounding data protection, such as the GDPR. This risk value, together with other data security and protection measures, may create a more comprehensive approach to identify and protect cyberattacks and data breach at an enterprise level.

The data security and protection system may provide additional advantages and solutions. For example, risk value calculation based on a dynamic approach using correlation and population attribute data may provide more accurate and reliable identification of sensitive personal data. Furthermore, the data security and protection system described herein may allow greater flexibility and customization because the risk value calculations result in a percentage, where thresholds may also be adjusted, as compared to a coarse rating of "high," "medium," or "low," which is typical of standard approaches. The system may provide security and protection solutions that use more of the available information and resources to an organizational entity. And given the constant developments in laws and regulations surrounding data security, the system described herein is designed to be readily adaptable to continual changes. The system may also reduce overall cost and improve efficiencies by providing more granular assessment of risks associated with personal data. In an example, risk value may be aggregated across documents, databases, systems, etc. This may help prioritize the systems that are most at risk, and may help an organization focus their data protection efforts (more efficient use of resources). The system may also greatly assist an organization to defend themselves from a compliance investigation, as they would show to be doing everything in their power to protect sensitive data. It is becoming increasingly essential that organizations are aware of where the risks are. In the event a data breach has already happened, assessment of the associated risk value of the breached data may allow an organization to respond in the most appropriate manner. For instance, the compromised organizational entity may ask, "do we have a regulatory or compliance situation on our hands?" and use the risk value to more readily assess its regulatory obligation and hence minimize any potential fines or other penalties. Under the GDPR, for example, an organizational entity must complete a risk assessment report when deploying new systems/technologies. The risk value created from the system may an important element used to quantify risks being undertaken.

In one example, the data security and protection system may using uniqueness factor classification and analysis to identify sensitive personal data and determine potential risk associated with the personal data. This may be achieved in a number of various ways. For example, the data security and protection system may receive personal data associated with a subject from a data source. The data source may be public, private, or a combination thereof. For example, the data source may be an enterprise resource planning (ERP) system, a document, a web feed, a sensor, a geolocation data source, an enterprise database, a public database, a server, an analytics tool, a mobile device, a reporting system, or a combination thereof. The personal data may be found in a document governed by data security and protection laws. The document may be under control of an organizational entity. The personal data may comprise a plurality of non-unique identifiers associated with the subject. For example, these may comprise at least one name, gender, age, height, date of birth, eye color, hair color, hair type, blood type, employer, salary, marriage history, and number of children.

The data security and protection system described herein may receive a plurality of population attribute data from a population data source. The population data source may be public, private, or a combination thereof. For example, the population data source may be a census database. The plurality of the population attribute data may correspond with the non-unique identifiers associated with the subject.

The data security and protection system described herein may compare the plurality of non-unique identifiers with the plurality of population attribute data from the population data source corresponding to the non-unique identifiers associated with the subject. The data security and protection system described herein may also determine a fraction assignment for each of the plurality of non-unique identifiers associated with the subject. The fraction assignment may represent a percentage of a population pool that shares the non-unique identifier. The population pool may be based on the at least plurality of the population attribute data that corresponds with the non-unique identifiers associated with the subject.

The data security and protection system described herein may create new combinations of non-unique identification categories. This may be achieved by correlating the plurality of non-unique identifiers with each of the plurality of non-unique identifiers associated with the subject, and may be based at least in part on the fraction assignment for each of the plurality of non-unique identifiers. The new combinations of non-unique identification categories may be fewer that than the plurality of non-unique identifiers to improve risk assessment calculation efficiencies.

The data security and protection system described herein may calculate a total number of subjects in the population pool that share the plurality of non-unique identifiers associated with the subject based on a correlation technique. The data security and protection system described herein may then generate a risk value of the personal data associated with the subject based at on the calculation of total number of subjects in the population pool that share the plurality of non-unique identifiers associated with the subject. It should be appreciated that the risk value may be a percentage-based value that represents a sensitivity of the personal data associated with the subject.

The data security and protection system described herein may generate a data security and protection report that includes the risk value. In an example, this report may be transmitted to a security manager. The data security and protection system described herein may perform a security action based on the risk value. For example, this may also include fine-tuning the data security and protection system, adjusting a security threshold, performing additional security analytics, and/or any other security related action.

FIG. 1 illustrates an architecture for a data security and protection system 100, according to an example. The data security and protection system 100 may be used to monitor and analyze data. In particular, the data security and protection system 100 may be used monitor and analyze data in an enterprise environment for an organization entity. The data security and protection system 100 may also store information or be able to receive information from other sources associated with personal data or information, some of which may be sensitive personal data or information. For example, the data security and protection system 100 may protect sensitive personal data using uniqueness factor classification and analysis. The data security and protection system 100 may further include a clustering system to provide risk analysis of personal and sensitive data.

The data security and protection system 100 may operate in an network or an enterprise environment where data is exchanged. More specifically, the data security and protection system 100 may provide real-time or near real-time monitoring and analysis of data exchange and data storage to provide improved security of sensitive or potentially sensitive data. The enterprise environment of the data security and protection system 100 may include a data source layer 101, an enterprise hub 111, and an applications layer 121. The data source layer 101 may include systems, subsystems, applications, and/or interfaces to collect information from enterprise resource planning (ERP) systems and applications 102 (hereinafter "ERP"), documents 103, web feeds 104, machine and sensor data 105 (hereinafter "sensor data"), and geolocation data 106, all of which may be distinct or integrated with the data security and protection system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other outside parties. As a result, the ERP 102 may contain large quantities of information and data associated with a company and its employees, some of which may be potentially sensitive personal data.

The documents 103 may provide another source of data. Data received at the documents 103 may include files, emails, faxes, scans, or other documents that are transmitted, received, and stored in an enterprise environment.

The web feeds 104 may be yet another source of data. Data received at the web feeds 104 may include data from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photo-sharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information in an enterprise environment. For example, in an enterprise network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data 105 may provide significant amounts of information and data that can be collected. Together with other technologies and systems, the machine and sensor data 105 may help enable the data security and protection system 100 provide the greater monitoring and analysis of data exchange and data storage for improved security of sensitive or potentially sensitive data.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, ISP, language, proxies, or other information that can be used to piece together and trace location. This and other data in the data source layer 101 may be collected, monitored, and analyzed to improved security of sensitive or potentially sensitive data as well as prevent or reduce occurrence of data breach or compromise.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. In order to do this, the enterprise hub 111 may include one or more data stores, one or more servers, and other elements to process data for its organizational purposes. For example, the enterprise hub 111 may include a data management store 112a, an operational data store 112b, and an enterprise data store 112c. The data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112b may store information and data associated with operational reporting, controls, and decision-making. The operational data store 112b may be designed to integrate data from multiple sources for additional operations on that data, for example, in reporting, controls, and operational decision support. Integration of data at the operational data store 112b may involve cleaning, resolving redundancy, checking against business rules, and other data integration techniques, such as data virtualization, federation, and extract, transform, and load (ETL). The operational data store 112b may also be a source of data for an enterprise data store 112c, which may be used for tactical and strategic decision support.

The enterprise data store 112c may store information and data associated with reporting and data analysis, and may be instrumental to various business intelligence functions. For example, the enterprise data store 112c may be one or more repositories of integrated data (e.g., from the operational data store 112b) and used to store current and historical data and to create analytical report(s) for advanced enterprise knowledge. Data passed through the enterprise data store 112c may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided.

There may be many examples of hardware that may be used for any of the servers, layers, subsystems, and components of the analytics system 200 or the data security and protection system 100. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the data security and protection system 100. More detail of the analytics system 200 is provided in FIG. 2.

The data security and protection system 100 may also include an applications layer 121. The applications layer 121 may include any number or combination of systems and applications that interface with users or user-interfacing tools in an enterprise environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the data security and protection system 100. However, it should be appreciated that multiple servers may be used for each of these servers, and the servers may be connected via one or more networks. Also, middleware (not shown) may include in the data security and protection system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the back-end to facilitate the features and functionalities of the data security and protection system 100.

Within the data security and protection system 100, there may be a large amount of data that is exchanged, and the exchanged data may contain sensitive personal data. Many of the conventional security systems for protecting sensitive data, as described above, are static and not dynamic. They do not adequately or reliably identify with granularity the potential sensitive of personal data in an enterprise environment. With new laws and regulations surrounding sensitive personal data in possession by organizational entities, a more robust approach to identify potentially sensitive personal data may be needed. The data security and protection system 100, as described herein, may solve this technical problem by providing a dynamic and scientific approach to provide monitoring, diagnostics, and analytics to identify potentially sensitive data in an enterprise network. In one example, the data security and protection system 100 may use uniqueness factor classification and analysis to identify sensitive personal data and determine potential risk associated with the personal data.

Figure 2:
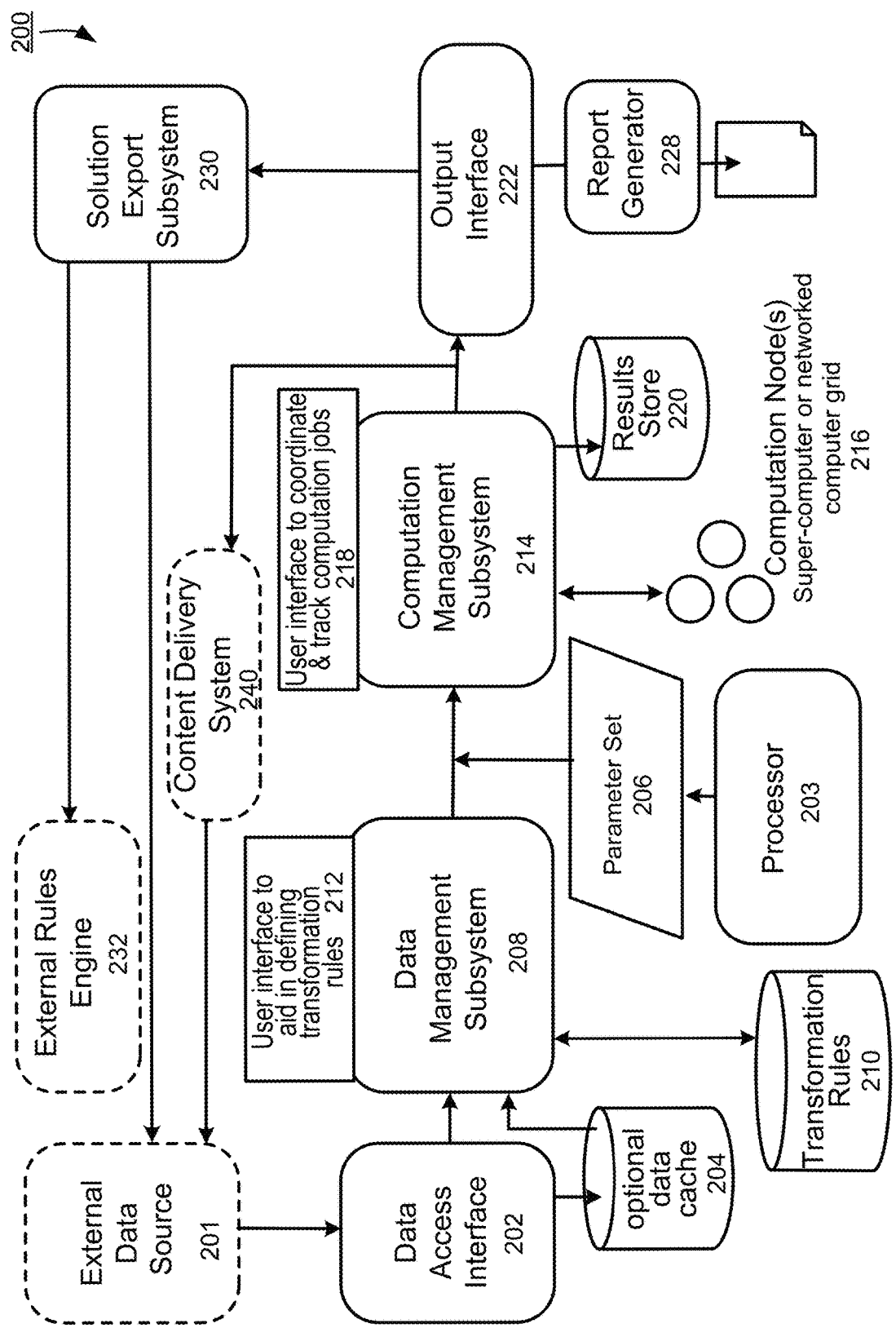
FIG. 2 illustrates an example of components in an analytics system, according to an example.

FIG. 2 illustrates an example of components in the analytics system 200, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide identification and protection of sensitive personal data using uniqueness factor classification and analysis. In an example, the analytics system 200 may be an integrated system as part of the enterprise hub 111 shown in FIG. 1.

In the example of FIG. 2, data may be accessed from an external data source 201 by a data access interface 202. The external data source 201 may be any data source from the data source layer 101, enterprise hub 111, and applications layer 121 of the data security and protection system 100 of FIG. 1, as well as other data sources not depicted. The data access interface 202 may optionally store some or all (or none) of the data in an optional data cache 204, which may be local or remote. The imported data may then be passed to a data management subsystem 208 for processing prior to performing analytics. For example, the data management subsystem 208 may organize the data by grouping, ordering, transforming, or cleaning the data in such a way that facilitates input of the data into analytics processing. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 to a user that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

In an example involving clustering, the analytics system 200 may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall population. These may describe the population and may be significantly different from the business drivers. Profile Variables may be other factors that are not assigned as cluster candidates or target drivers. Profile variables may not be immediately actionable (the data may not be easily accessible or may be found only after a period of lime) or they may be too much of a restatement of the business drivers.

The variables determined by the data management subsystem 208 and a parameter set 206 generated by the processor 203 may be provided to the computation management subsystem 214. The computation management subsystem 214 may send the processed data including the parameter set 206 and one or more chosen clustering algorithms to one or more computational nodes 216 to perform clustering operations. The clustering operations may identify several (e.g., thousands or millions) different cluster solutions, each including a plurality of clusters of the data.

The computation management subsystem 214 may evaluate generated cluster solutions based on user-specified criteria, and iterate through multiple sets of cluster solutions to identify cluster solutions that satisfy the criteria. The computation management subsystem 214 may identify also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. The computation management subsystem 214 may also provide a user interface 218 that shows the user the progress of the clustering and shows cluster solutions.

The computation management subsystem 214 may also provide a user interface 212 that shows the user the progress of the clustering and shows cluster solutions. The user interface may be an output interface 221, like that shown in FIG. 1, which may in turn include a visualization interface that may show cluster solution(s) and other information pertaining to the cluster solutions. A report generator 228 may generate report regarding the cluster solutions.

In some implementations, the visualization interface may also provide the cluster solution(s) and/or evaluation results to a solution export subsystem 230. The solution export subsystem 230 may provide feedback information to the analytics system 200 or other systems in the data security and protection system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a cluster solution to different types of external databases and external systems, and facilitate the implementation of the cluster solution by the external systems. In some implementations, the solution export subsystem 230 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the analytics system 200 may enable more than just an analytics tool, but also enable a feedback-based and connected enterprise system.

The output interface 222 may include a visualization interface that provides the resulting cluster solution(s) and results of the evaluation to a report generator 228, which may generates a report to be output to the user, such as a security manager or other user. The report may include various types of information regarding the evaluation of the cluster solution(s) or other calculation, and may enable a user to adjust one or more variables of the analytics system 200 to fine-tune the clustering operations.

As a commercial example, for a data set of 10,000 customers with voluminous data (e.g., from a customer survey), the analytics system 200 may select some subset of variables from that data set (e.g. 5 variables) and generate a cluster solution that divides those 10,000 customers into 4 different groups. For example, cluster A may include "high-value" customers that generate a majority of the company's profits, such that the company may want to ensure maintaining its marketing budget for those customers; cluster B may include "moderate-value" customers; cluster C may include "low-value" customers that generate very little profits and may even cost the company money; and cluster D may include "prospective" customers that represent opportunity for new sales, such that the company may want to market to them more aggressively.

Now consider a scenario in which, after those 10,000 customers have been assigned to four clusters, the company wants to organize and cluster another 1 million customers into the four cluster groups. The analytics system 200 may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the cluster solution in a manner that is independent of system that generated the cluster solution, such that the company can easily implement the cluster solution locally within its own systems. In some implementations, the exported solution may only need as input the selected subset of variables (e.g., 5 variables in the example above) that were used in the cluster solution computation.

By providing a composite technique of cluster generation and cluster evaluation, the analytics system 200 may enable the user to analyze the details and nuances of many (e.g., dozens of) solutions at the same time, rather than individually analyzing one solution at a time to see if each solution is appropriate. The analytics system 200 may therefore enable a user to explore a large number (e.g., millions) of cluster solutions efficiently in less time than it would take a typical practitioner to evaluate fewer (e.g., a couple dozen) cluster solutions.

In an example, the analytics system 200 may also include an external system, such as content delivery system 240, that may be controlled based on a selected cluster solution. For example, instructions may be sent to the content delivery system 240 based on attributes determined for clusters in the selected cluster solution. In an example, attributes may be identified for a cluster that are associated with customers shopping with coupons, which may indicate that a shopping pattern associated with coupons exists that is particular to shoppers from a particular geographic location, such as a north west region. The computation management subsystem 214 or another subsystem or layer not shown may send instructions to the content delivery system 240 to digitally send electronic coupons over a network to customers in the north west region. In an example, the content delivery system 240 may include a contact resource management system, such as provided by Salesforce.com®, Infusionsoft®, Microsoft Dynamics®, etc., which automatically targets customers. For example, data in a database that is associated with customers in the north region may be queried and for each customer customized emails or coupons are automatically sent. The content delivery system 240 may have the flexibility to send emails and coupons with a time-interval of hours, days, weeks, etc. and also has an option to trigger sending through the instructions. The external data source 201 may capture online behaviors of the targeted customers to determine whether the coupons are being used for purchases and to provide feedback for future clustering.

In some implementations, the user interfaces 212, 218, including the output interface 222, may be custom-designed user interfaces that facilitate some portion of the overall activity and, in some cases, may be used by multiple users with different roles. As such, the analytics system 200 may coordinate and facilitate a distributed process of cluster generation and evaluation, and streamline the tasks and roles that potentially involve the participation of multiple people.

For an example involving data security and protection, the analytics system 200 may monitor and analyze data exchanged in an enterprise network to determine sensitivity of data and identify potential risks associated with that data. As described above, many new laws and legislation are being passed to better protect private and personal data. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. Accordingly, the analytics system 200 may provide monitoring, diagnostics, and analytics to identify potentially sensitive data. In one example, the data security and protection system 100 may use uniqueness factor classification and analysis to identify sensitive personal data and determine potential risk associated with the personal data.

Figure 3:
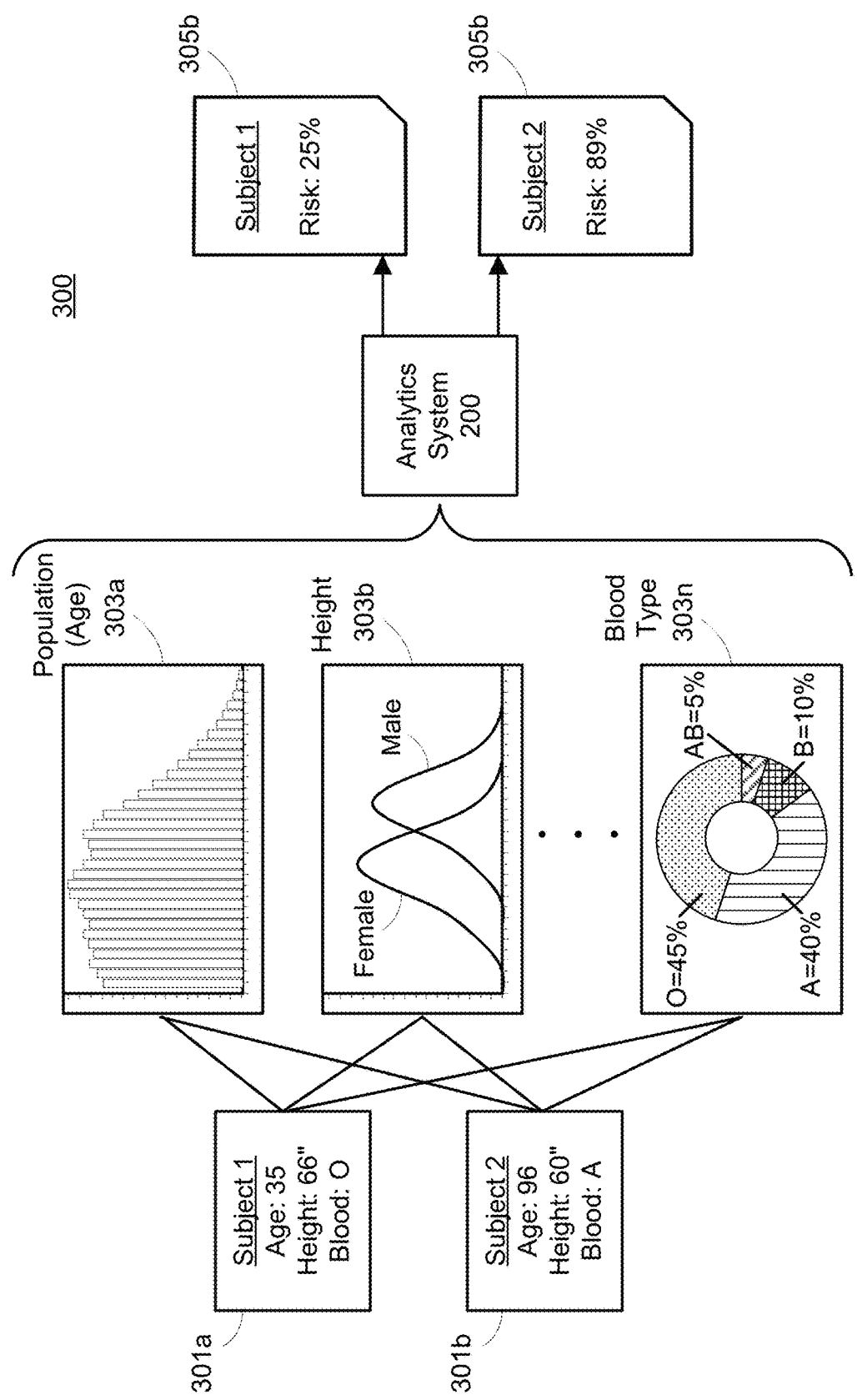
FIG. 3 illustrates a flow diagram for risk assessment, according to an example.

FIG. 3 illustrates a data flow diagram 300 for risk assessment, according to an example. In an example, the data flow diagram 300 may be used to determine risk and sensitivity of data associated with two subjects—Subject 1 301*a* and Subject 2 301*b*. As depicted, Subject 1 301*a* may be a 35-year-old male, 66 inches tall, and have blood type O. Subject 2 301*b* may be a 96-year-old male, be 60 inches tall, and have blood type A. The data associated with Subject 1 301*a* and Subject 2 301*b* may be used, stored, and controlled by Company X. In order to comply with data security and data protection laws, Company X may take this data associated with Subject 1 301*a* and Subject 2 301*b* and use up-to-date and publicly-available population statistics determine and assess risk of this data.

For example, analytics system 200 may process and analyze the data associated with Subject 1 301*a* and Subject 2 301*b* against population statistics for age 303*a*, height 303*b*, and blood types 303*n* to determine risk or sensitivity values for Subject 1 301*a* and Subject 2 301*b*. For instance, a report may be generated for each of Subject 1 301*a* and Subject 2 301*b* that indicates the risk or sensitivity value associated with Subject 1 301*a* and Subject 2 301*b*. At a basic level, it should be appreciated that the data associated with Subject 2 301*b* would result in a higher risk or sensitivity value compared to data associated with Subject 1 301*a*. This may be because there are fewer males that are 96 years old, have blood type A (rarer than blood type O), and relatively on the shorter side at 60 inches tall. Even though the data for Subject 1 301*a* and Subject 2 301*b* had exactly the same identification categories, the analytics system 200 may be used to determine that Subject 2 301*b* has a significantly higher risk value (and therefore sensitivity) when compared to Subject 1 301*a*.

Although two subjects are shown in the data flow diagram 300 of FIG. 3, it should be appreciated that the data security and protection system 100 of FIG. 1 and the analytics system 200 of FIGS. 2 and 3 may be able to monitor and analyze a large amount of data associated with numerous subjects. Although three types of publicly-available population statistics are shown in the data flow diagram 300 of FIG. 3, it should be appreciated that a variety of other data or information may be used to determine and assess uniqueness of the personal data. For instance, information or data associated with geography, population, census, privately gathered and stored information on population, etc. may also be used. While the reports 305a and 305b outputted by the analytics system 200 only depict a risk or sensitivity value in percentage (%), it should be appreciated that other information regarding data security and protection may be outputted and in a variety of different usable formats in addition to a physical or electronic report.

The analytics system 200 may receive data associated with subjects or individuals via the data access interface 202. As described above, this may come from a variety of data sources (e.g., data source layer 101, enterprise hub 111, applications layer 121) of the data security and protection system 100 or elsewhere. The data access interface 202 may also receive population data (public, private, or combination thereof) from these data sources or from storage. The data management subsystem 208 may clean and reformat this data and information so that the processor 203 and the computation management subsystem 214 may determine uniqueness of the data associated with the one or more individuals or subjects.

The processor 203 and the computation management subsystem 214 may use the data received at the data access interface 202 to calculate a risk (or sensitivity) value, which is based on the uniqueness of the data associated with one or more individuals. The processor 203 and the computation management subsystem 214 may calculate the risk or sensitivity value by using, at least in part, the formulation below:

$$P \times \prod_{i=1}^{n} f_i = X,$$

where
P represents a population group, n represents a number of known non-unique items on a data subject (e.g., if know name, age, hair color, then n=3), f represents a fraction of population that share the non-unique items, and X represents a number of people that share a combination of available attributes.

Figure 4:
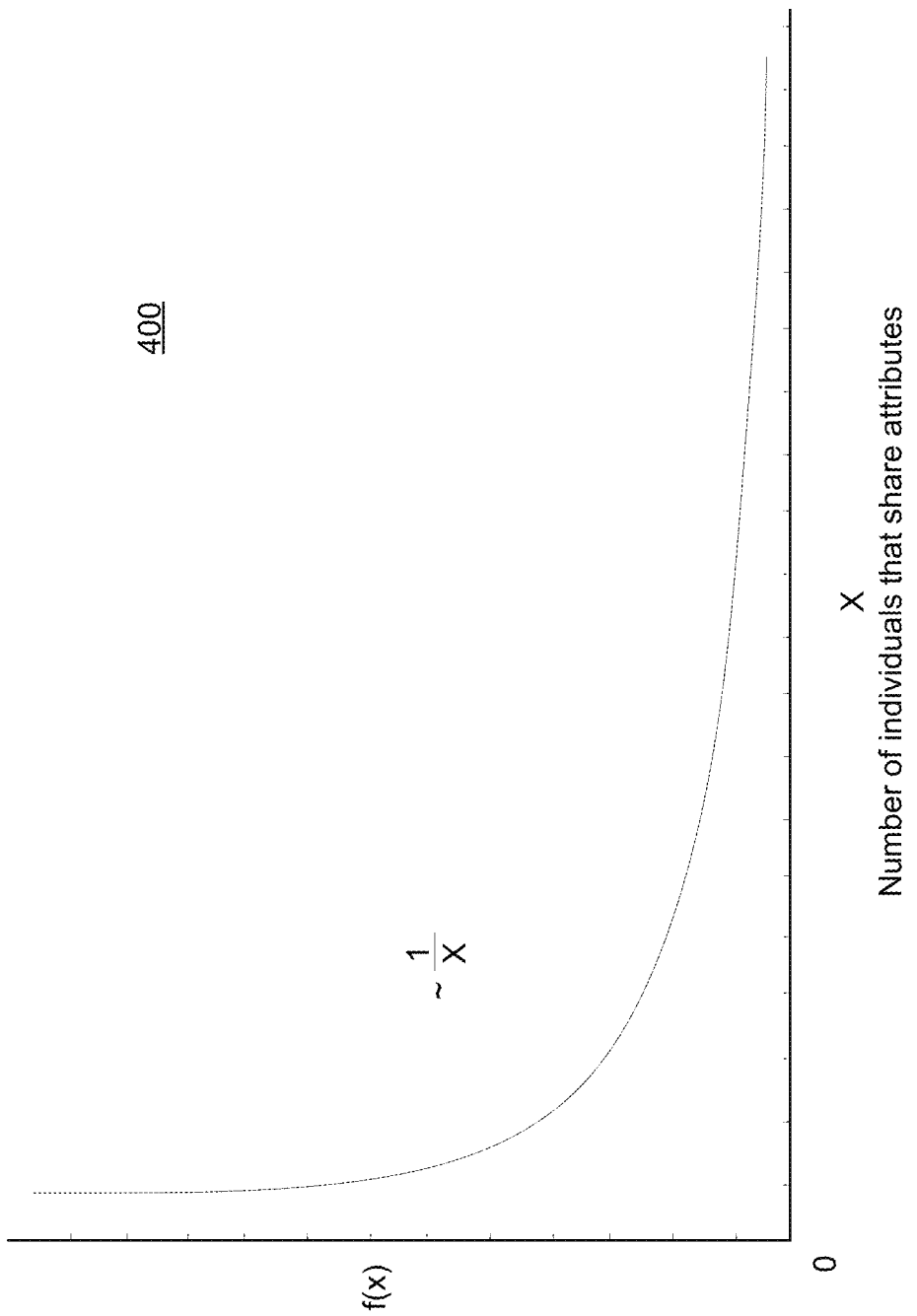
FIG. 4 illustrates a correlation function graph, according to an example.

The processor 203 and the computation management subsystem 214 may calculate the risk or sensitivity value as a reciprocal type function of X that increases rapidly as X approaches 1, as shown in FIG. 4. Furthermore, the processor 203 and the computation management subsystem 214 may use correlation considerations to further determine the risk or sensitivity value.

Figure 5:
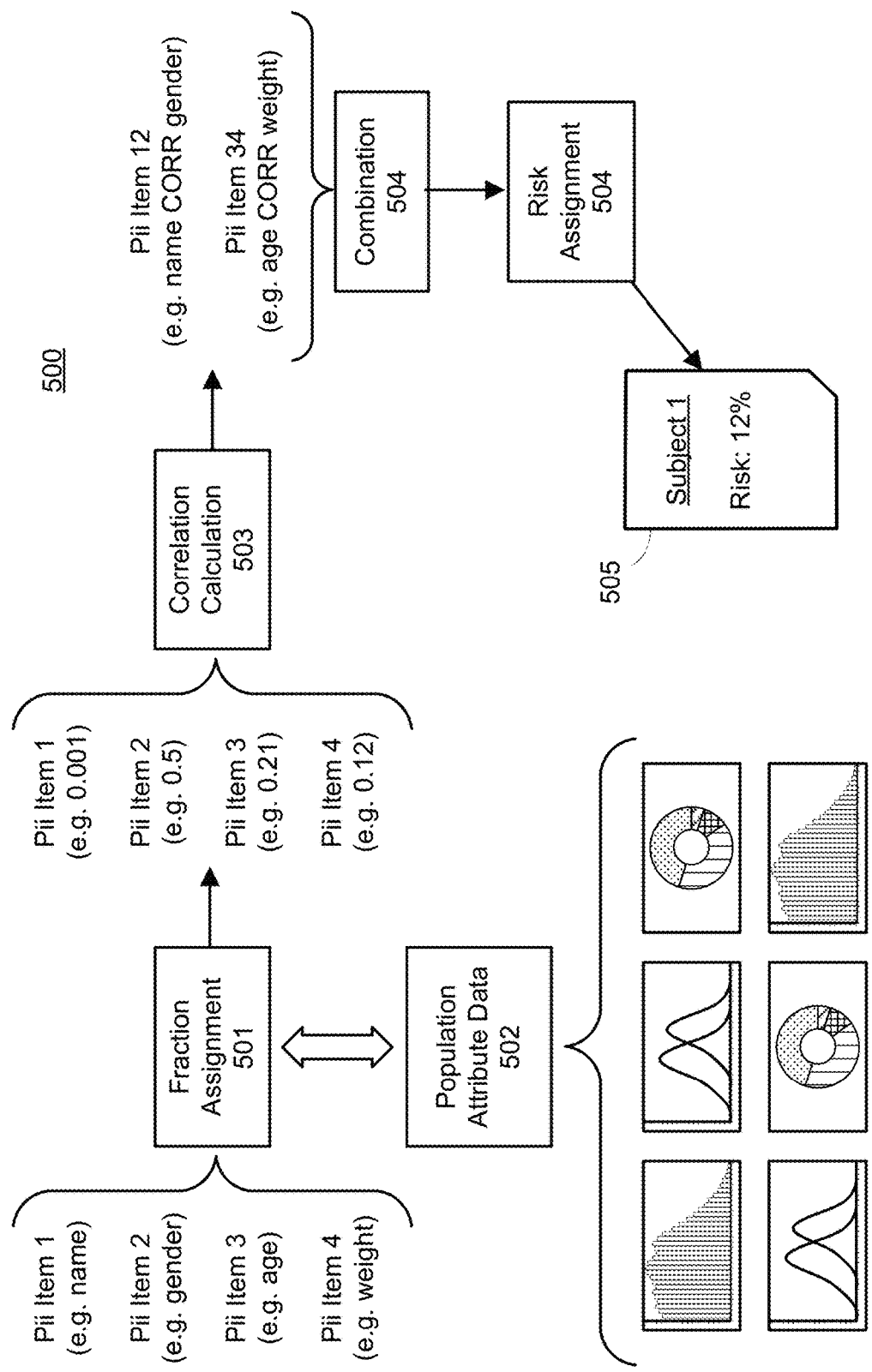
FIG. 5 illustrates a data flow diagram for risk assessment, according to an example.

FIG. 5 illustrates a data flow diagram 300 for risk value calculation, according to an example. There may be any number of non-unique identifiers (Pii) to be analyzed to determine uniqueness. In this example, there are four non-unique identifiers listed (e.g., name, gender, age, and weight). The processor 203 and the computation management subsystem 214 may take these non-unique identifiers and perform a fraction assignment 501. In order to this, the processor 203 and the computation management subsystem 214 may use population attribute data 502. These may be charts, graphs, curves, or other data that may measure general or specific population attribute data for at least one of the non-unique identifiers. In this case, the subject individual for which risk or sensitivity calculations are being made may be a 35-year-old male, weigh 165 pounds (lbs.), and live in New York. The fraction assignment 501 may take the non-unique identifiers associated with the subject and determine the percentage or fraction for each of these non-unique identifiers across the general population in New York. It should be appreciated that there may be a number of different sources for population attribute data 502. More recent and more granular population attribute data 502 may result in more accurate calculations of uniqueness or sensitivity. In this example, it may be determined that the data associated with the subject yields various percentages or fractions, such as 0.001 for name, 0.5 for gender, 0.21 for age, and 0.12 for weight.

Once the fraction assignment 501 has been determined, further calculations may be made. For instance, the processor 203 and the computation management subsystem 214 of the analytics system 200 may then perform a correlation calculation 503 and a combination 504. In this case, the non-unique identifier for "name" may be correlated with "gender" and the non-unique identifier for "age" with "weight." Formation of these new non-unique identification groupings may facilitate additional calculations. These and other non-unique identifiers and their percentages or fraction assignments against the general population attribute data in a particular geographic locale, for example, may yield more granular and more accurate results. Using this information, the processor 203 and the computation management subsystem 214 may then calculate sensitivity using, for example, the formulation described above, to output a risk value, which may be in the form of a report 505. In this example, the risk assignment is a 12%, which may not amount to a level where any further action needs to take place. That said, it should be appreciated that an organizational entity or enterprise may determine the various thresholds that should govern any further action based on data protection and security laws governing each relevant jurisdiction. These actions may include making an assessment on the type of data being stored by the company and whether or not all of this information needs to be stored on enterprise premises, e.g. does a bank need to record shoe sizes. If one data store is found to have many high risk profiles, it may be determined that a proper security action may involve distributing such information among highly secure data stores and reduce the risk of a large data breach. In some situations, a threshold may be applied. The threshold may be a number that represents a minimum amount of people identified as having the same or similar profile considered to be low risk. This number may be adjusted based on one or more variables, such as jurisdiction, industry being assessed, or other pertinent category. For example, a company based on only Irish user data may apply a much lower threshold than one based in the United States due to the large differences in population. Other various examples may also be provided.

Although many of the aforementioned functions and features are described as being performed by the processor 203 and the computation management subsystem 214, it should be appreciated that the functions and features described may be performed individually or in combination by the processor 203 and the computation management subsystem 214.

Figure 6:
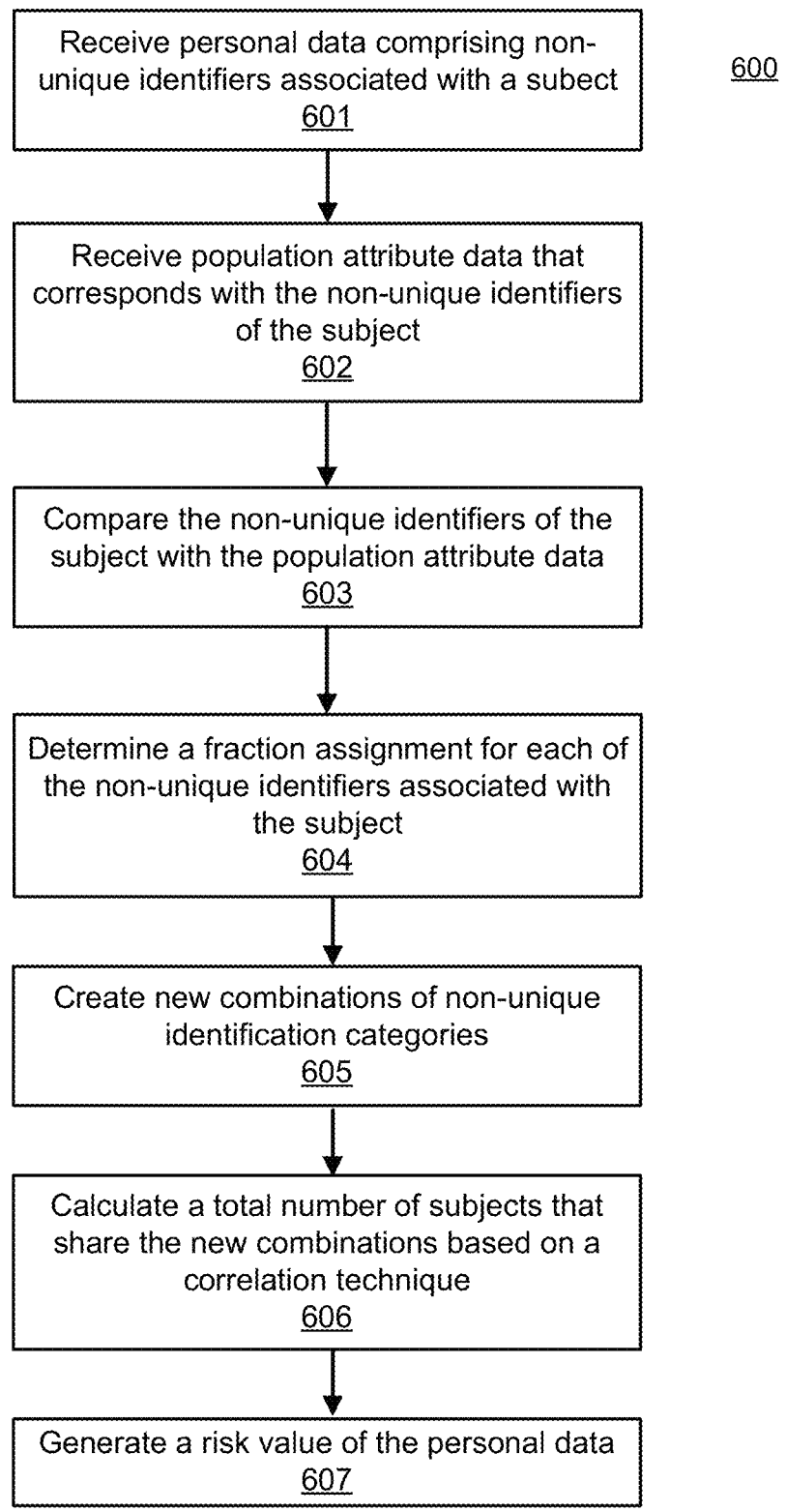
FIG. 6 illustrates a method for data security and protection using uniqueness factor classification and analysis, according to an example.

FIG. 6 illustrates a method 600 for data security and protection using uniqueness factor classification and analysis, according to an example. The method 600 is provided by way of example, as there may be a variety of ways to carry out the method described herein. Although the method 600 is primarily described as being performed by system 100 as shown in FIG. 1 or system 200 as shown in FIGS. 1-3, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At 601, the data access interface 202 of the analytics system 200 may receive personal data associated with a subject from a data source. As described herein, the personal data may be found in a variety of sources within an organization entity, such as a document or other source. The document may be under control of the organizational entity and the personal data in the document may be governed by data security and protection laws that warrants care and protection. The personal data may include one or more non-unique identifiers associated with the subject. For example, these may include name, gender, age, height, date of birth, eye color, hair color, hair type, blood type, employer, salary, marriage history, number of children, or other non-unique identifier. It should be appreciated that the personal data may also include unique identifiers, such as driver's license, passport number, social security number, credit card number, biometric identification data, or other unique identifiers. However, personal data with unique identifiers may be more readily determined to be sensitive data.

At 602, the data access interface 202 of the analytics system 200 may receive a plurality of population attribute data from a population data source. The population data source may be public, private, or a combination thereof. The population attribute data may correspond with the non-unique identifiers associated with the subject. In an example, the population data source may be a census database that provides information regarding a particular population attribute (e.g., age) within a particular geographic location (e.g. New York), which may correspond with the non-unique identifiers associated with the personal data of the subject.

At 603, the analytics system 200 may compare the plurality of non-unique identifiers with the plurality of population attribute data from the population data source corresponding to the non-unique identifiers associated with the subject.

At 604, the analytics system 200 may determine a fraction assignment for each of the plurality of non-unique identifiers associated with the subject. The fraction assignment may represent a percentage of a population pool that shares the non-unique identifier. In an example, the population pool may be based on the population attribute data that corresponds with the non-unique identifiers associated with the subject. For example, if the personal data associated with a subject includes non-unique identifiers, such as name, age, and height, the population attribute data received from the population data source may be directed these same categories of name, age, and height.

At 605, the analytics system 200 may create new combinations of non-unique identification categories. For instance, the analytics system 200 may correlate the plurality of non-unique identifiers based at least in part on the fraction assignment for each of the plurality of non-unique identifiers associated with the subject. In effect, the new combinations of non-unique identification categories may be fewer that than the plurality of non-unique identifiers, and as a result, reduce a number of non-unique identification categories. By reducing the number of categories, efficiency in risk assessment calculation may be achieved.

At 606, the analytics system 200 may calculate a total number of subjects in the population pool that share the plurality of non-unique identifiers associated with the subject based on a correlation technique.

At 607, the analytics system 200 may generate a risk value of the personal data associated with the subject based at on the calculation of total number of subjects in the population pool that share the plurality of non-unique identifiers associated with the subject based on the correlation technique, described above. It should be appreciated that the risk value may be a percentage-based value that represents a uniqueness of the personal data with the subject, and as described above, uniqueness classification and determination may be directly or indirectly related to a sensitivity of the personal data.

Once the risk value is determined, the analytics system 200 may perform a number of actions. For example, the output interface 222 may provide the risk value to a report generation 228 to generate a report. This report may then be provided to a security manager. The report may also be used to perform a number of other security actions to improve data protection. In another example, the output interface 222 may send the risk value to the solution export subsystem 230 to fine-tune the data security and protection system (e.g., by adjusting a security threshold) or performing additional security analytics.

It should be appreciated that the data flows and methods described above are examples of scenarios provided by the data security and protection system 100 of FIGS. 1-3. Other examples or scenarios may also be contemplated. For instance, there may be a situation where functions and features of the system 100 may be employed via a cloud application. The cloud application may then facilitate the data security and protection analysis as described herein.

It should be appreciated that in addition to overcoming the conventional static or matrix approach associated with traditional systems, examples described herein with regard to the data security and protection system may provide additional advantages and solutions. For example, risk value calculation based on a dynamic approach using correlation and population attribute data may provide more accurate and reliable identification of sensitive personal data. Furthermore, the data security and protection system described herein may allow greater flexibility and customization because the risk value calculations result in a percentage, where thresholds may also be adjusted, as compared to a coarse rating of "high," "medium," or "low," which is typical of standard approaches. The system may provide security and protection solutions that use more of the available information and resources to an organizational entity. And given the constant developments in laws and regulations surrounding data security, the system described herein is designed to be readily adaptable to continual changes. The system may also reduce overall cost and improve efficiencies by providing more granular assessment of risks associated with personal data.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

The invention claimed is:

1. A system for providing data security and protection, comprising:
   one or more data stores to store and manage personal data within a network;
   one or more servers to facilitate operations using information from the one or more data stores; and
   a data security and protection system that communicates with the one or more servers and the one or more data stores to provide data security and protection of personal data in the network, the data security and protection system comprising:
      a data access interface to:
         receive personal data associated with a subject from a data source, wherein the personal data is found in a document, and wherein the personal data comprises a plurality of non-unique identifiers associated with the subject, and
         receive a plurality of population attribute data from a population data source, wherein the plurality of the population attribute data corresponds with the non-unique identifiers associated with the subject;
      a processor to:
         compare the plurality of non-unique identifiers with the plurality of population attribute data from the population data source corresponding to the non-unique identifiers associated with the subject,
         determine a fraction assignment for each of the plurality of non-unique identifiers associated with the subject, wherein the fraction assignment represents a percentage of a population pool that shares the non-unique identifier, and wherein the population pool is based on the at least plurality of the population attribute data that corresponds with the non-unique identifiers associated with the subject,
         create new combinations of non-unique identification categories by correlating the plurality of non-unique identifiers based on similarity of each of the plurality of non-unique identifiers associated with the subject, wherein the new combinations of non-unique identification categories are fewer that than the plurality of non-unique identifiers, and wherein the new combinations of non-unique identification categories increases calculation efficiencies,
         calculate a total number of subjects in the population pool that share the new combinations of non-unique identification categories associated with the subject based on a correlation technique, wherein the correlation technique is expressed as:

$$P \times \prod_{i=1}^{n} f_i = X,$$

where P represents the population pool, n represents a number of non-unique identifiers associated with the subject, f represents a fraction of population that share the non-unique identifiers, and X represents a number of subjects that share a combination of available attributes; and
         generate a risk value of the personal data associated with the subject based at least on the calculation of total number of subjects in the population pool that share the plurality of non-unique identifiers associated with the subject based on the correlation technique, wherein the risk value is a percentage-based value that represents a sensitivity of the personal data associated with the subject based on a uniqueness of the personal data with the subject; and
      an output interface comprising a report generation system to provide a data security and protection report based on the risk value of the personal data associated with the subject.

2. The system for providing data security and protection of claim 1, wherein:
   the one or more data stores comprises at least one of a data management store, an operational data store, and an enterprise data store; and
   the one or more servers comprises at least one of an exchange server, a content management server, an application server, a database server, a directory server, a web server, an enterprise servers, and an analytics server.

3. The system for providing data security and protection of claim 1, wherein the data source comprises at least one of an enterprise resource planning (ERP) system, a documents, a web feed, a sensor, a geolocation data source, an enterprise database, a public database, a server, an analytics tool, a mobile device, and a reporting system.

4. The system for providing data security and protection of claim 1, wherein the document is under control of an organizational entity and the personal data in the document is governed by data security and protection laws.

5. The system for providing data security and protection of claim 1, wherein the non-unique identifiers comprise at least one name, gender, age, height, date of birth, eye color, hair color, hair type, blood type, employer, salary, marriage history, number of children.

6. The system for providing data security and protection of claim 1, wherein the population data source comprises at least one of a census database.

7. The system for providing data security and protection of claim 1, further comprising a security server to perform a security action based on the data and security protection report with the risk value of the personal data associated with the subject, wherein the security action comprises as least one of: displaying the data and security protection report to a security manager, fine-tuning the data security and protection system, adjusting a security threshold, and performing additional security analytics.

8. A system for identifying sensitivity of personal data, comprising:
   a data access interface to:
      receive personal data associated with a subject from a data source, wherein the personal data is found in a document, and wherein the personal data comprises a plurality of non-unique identifiers associated with the subject, and
      receive a plurality of population attribute data from a population data source, wherein the population data source comprises at least one of a census database, and wherein plurality of the population attribute data corresponds with the non-unique identifiers associated with the subject;
   a processor and a memory storing instructions, which when executed by the processor, cause the processor to:
      compare the plurality of non-unique identifiers with the plurality of population attribute data from the population data source corresponding to the non-unique identifiers associated with the subject, determine a fraction assignment for each of the plurality of non-unique identifiers associated with the subject, wherein the fraction assignment represents a percentage of a population pool that shares the non-unique identifier, and wherein the population pool is based on the at least plurality of the population attribute data that corresponds with the non-unique identifiers associated with the subject, create new combinations of non-unique identification categories by correlating the plurality of non-unique identifiers based on similarity of each of the plurality of non-unique identifiers associated with the subject, wherein the new combinations of non-unique identification categories are fewer that than the plurality of non-unique identifiers, and wherein the new combinations of non-unique identification categories increases calculation efficiencies, calculate a total number of subjects in the population pool that share the new combination of non-unique identification categories associated with the subject based on a correlation technique, wherein the correlation technique is expressed as:

$$P \times \prod_{i=1}^{n} f_i = X,$$

where P represents the population pool, n represents a number of non-unique identifiers associated with the subject, f represents a fraction of population that share the non-unique identifiers, and X represents a number of subjects that share a combination of available attributes;

generate a risk value of the personal data associated with the subject based at least on the calculation of total number of subjects in the population pool that share the plurality of non-unique identifiers associated with the subject based on the correlation technique, wherein the risk value is a percentage-based value that represents a sensitivity of the personal data associated with the subject based on a uniqueness of the personal data with the subject; and an output interface to transmit the risk value of the personal data associated with the subject to perform a security action.

9. The system claim 8, wherein the data source comprises at least one of an enterprise resource planning (ERP) system, a document, a web feed, a sensor, a geolocation data source, an enterprise database, a public database, a server, an analytics tool, a mobile device, and a reporting system.

10. The system of claim 8, wherein the document is under control of an organizational entity and the personal data in the document is governed by data security and protection laws.

11. The system of claim 8, wherein the non-unique identifiers comprise at least one name, gender, age, height, date of birth, eye color, hair color, hair type, blood type, employer, salary, marriage history, and number of children.

12. The system of claim 8, wherein the security action comprises as least one of: displaying a report to a security manager, fine-tuning the data security and protection system, adjusting a security threshold, and performing additional security analytics.

13. A method for providing data security and protection, comprising:

receiving, at a data access interface of an analytics system, personal data associated with a subject from a data source, wherein the personal data is found in a document, and wherein the personal data comprises a plurality of non-unique identifiers associated with the subject;

receiving a plurality of population attribute data from a population data source, wherein the population data source comprises at least one of a census database, and wherein plurality of the population attribute data corresponds with the non-unique identifiers associated with the subject;

comparing, by the analytics system, the plurality of non-unique identifiers with the plurality of population attribute data from the population data source corresponding to the non-unique identifiers associated with the subject;

determining a fraction assignment for each of the plurality of non-unique identifiers associated with the subject, wherein the fraction assignment represents a percentage of a population pool that shares the non-unique identifier, and wherein the population pool is based on the at least plurality of the population attribute data that corresponds with the non-unique identifiers associated with the subject;

creating new combinations of non-unique identification categories by correlating the plurality of non-unique identifiers based on similarity of each of the plurality of non-unique identifiers associated with the subject, wherein the new combinations of non-unique identification categories are fewer that than the plurality of non-unique identifiers, and wherein the new combinations of non-unique identification categories increases calculation efficiencies;

calculating a total number of subjects in the population pool that share the new combinations of non-unique identification categories associated with the subject based on a correlation technique, wherein the correlation technique is expressed as:

$$P \times \prod_{i=1}^{n} f_i = X,$$

where P represents the population pool, n represents a number of non-unique identifiers associated with the subject, f represents a fraction of population that share the non-unique identifiers, and X represents a number of subjects that share a combination of available attributes;

generating a risk value of the personal data associated with the subject based at least on the calculation of total number of subjects in the population pool that share the plurality of non-unique identifiers associated with the subject based on the correlation technique, wherein the risk value is a percentage-based value that represents a sensitivity of the personal data associated with the subject based on a uniqueness of the personal data with the subject; and providing, via an output interface of the analytics system, a report based on the risk value of the personal data associated with the subject.

14. The method of claim 13, wherein the data source comprises at least one of an enterprise resource planning (ERP) system, a document, a web feed, a sensor, a geolocation data source, an enterprise database, a public database, a server, an analytics tool, a mobile device, and a reporting system.

15. The method of claim 13, wherein the document is under control of an organizational entity and the personal data in the document is governed by data security and protection laws.

16. The method of claim 13, wherein the non-unique identifiers comprise at least one name, gender, age, height, date of birth, eye color, hair color, hair type, blood type, employer, salary, marriage history, and number of children.

17. The method of claim 13, wherein the risk value is based on a uniqueness of the personal data relative to the population pool represents, which represents a sensitivity of the personal data associated with the subject.

18. The method of claim 13, further comprising:
performing a security action comprising as least one of: displaying the report to a security manager, adjusting a security threshold, fine-tuning the analytics system, and performing additional security analytics.

* * * * *